United States Patent
Bhamidipati et al.

(10) Patent No.: US 11,971,779 B2
(45) Date of Patent: Apr. 30, 2024

(54) MACHINE LEARNING MODEL AND ASSOCIATED METHODS THEREOF FOR PROVIDING AUTOMATED SUPPORT

(71) Applicant: NETAPP, INC., Sunnyvale, CA (US)

(72) Inventors: Vedavyas Bhamidipati, Bangalore (IN); Prajwal V, Bangalore (IN)

(73) Assignee: NETAPP, INC., San Jose, CA (US)

( * ) Notice: Subject to any disclaimer, the term of this patent is extended or adjusted under 35 U.S.C. 154(b) by 675 days.

(21) Appl. No.: 16/796,039

(22) Filed: Feb. 20, 2020

(65) Prior Publication Data

US 2021/0264305 A1    Aug. 26, 2021

(51) Int. Cl.
| | |
|---|---|
| *G06F 11/07* | (2006.01) |
| *G06F 18/214* | (2023.01) |
| *G06F 18/22* | (2023.01) |
| *G06F 18/2415* | (2023.01) |
| *G06N 5/022* | (2023.01) |
| *G06N 5/04* | (2023.01) |

(52) U.S. Cl.
CPC ...... *G06F 11/0793* (2013.01); *G06F 18/2155* (2023.01); *G06F 18/22* (2023.01); *G06F 18/2415* (2023.01); *G06N 5/022* (2013.01); *G06N 5/04* (2013.01)

(58) Field of Classification Search
CPC .......... G06V 10/751; G06K 9/62; G06K 9/15; G06K 9/59; G06K 9/77; G06N 5/022; G06N 5/04; G06F 11/0793
See application file for complete search history.

(56) References Cited

U.S. PATENT DOCUMENTS

| 10,430,517 | B1 | 10/2019 | Mulwad et al. | |
|---|---|---|---|---|
| 10,977,293 | B2* | 4/2021 | Cai | G06F 3/0482 |
| 2017/0140315 | A1* | 5/2017 | Cao | G06Q 10/06311 |
| 2019/0347282 | A1 | 11/2019 | Cai et al. | |

(Continued)

OTHER PUBLICATIONS

Jansen, Peter, Mihai Surdeanu, and Peter Clark. "Discourse complements lexical semantics for non-factoid answer reranking." Proceedings of the 52nd Annual Meeting of the Association for Computational Linguistics (vol. 1: Long Papers). 2014. (Year: 2014).*

(Continued)

*Primary Examiner* — Viker A Lamardo
*Assistant Examiner* — Sidney Vincent Bostwick
(74) *Attorney, Agent, or Firm* — LOZA & LOZA, LLP (57) ABSTRACT

Computing technology for managing support requests are provided. The technology includes a processor executable application programming interface (API) that receives a support case indicating a problem associated with a device. The API utilizes a training model to predict a problem category for the support case. The training model predicts the problem category based on a feature extracted from information included in the support case. The training model further identifies a plurality of proximate support cases based on a distance between the support case and the proximate support cases within a virtual space assigned to the predicted problem category; determines relevance of each proximate support case to the support case; and outputs a resolution code for the support case based on the determined relevance of each proximate support case.

20 Claims, 7 Drawing Sheets

(56) References Cited

U.S. PATENT DOCUMENTS

2020/0026632 A1    1/2020  Brinkmann et al.
2020/0279180 A1*  9/2020  Yu .......................... G06N 5/04

OTHER PUBLICATIONS

Tripathi, A. (Nov. 17, 2019). Bayes' theorem with example for Data Science Professionals. Medium. Retrieved Mar. 20, 2023, from https://towardsdatascience.com/bayes-theorem-with-example-for-data-science-professionals-55b4d52f8967 (Year: 2019).*

Watson, Ian, and Farhi Marir. "Case-based reasoning: A review." The knowledge engineering review 9.4 (1994): 327-354. (Year: 1994).*

International Search Report on corresponding PCT application (PCT/US2021/012359) from International Searching Authority (EPO) dated Apr. 29, 2021.

Written Opinion on corresponding PCT application (PCT/US2021/012359) from International Searching Authority (EPO) dated Apr. 29, 2021.

\* cited by examiner

# MACHINE LEARNING MODEL AND ASSOCIATED METHODS THEREOF FOR PROVIDING AUTOMATED SUPPORT

TECHNICAL FIELD

The present disclosure relates to computing technology, and more particularly, to development of machine learning computer trained models for automatically processing support issues associated with different devices, and computing systems including software applications.

BACKGROUND

Technical support centers with one or more computing systems are used in various industries to address support issues associated with computing devices, including hardware, software, or a combination thereof, or any other type of device including consumer appliances, commercial appliances or any other system that generates electronic support requests. These support centers are used across different industries including airlines, automotive, data centers, retail establishments and others.

Typically, when an electronic support request is received, a support application routes the request to different organization levels. Based on the request type, a specific organization level attempts to solve the problem indicated by the request. Information regarding the support requests is typically stored at persistent storage devices. The stored information may include device information that is impacted by a reported problem, description of the problem and information regarding a solution.

Conventional support center technology is inefficient in using electronic information associated with support requests. The conventional state of the art is not sophisticated enough to automatically provide a solution to a support request based on historical resolution of similar problems. Furthermore, due to manual intervention and lack of automation, conventional support centers may take an undesirable amount of time and cost to resolve support issues. Continuous efforts are being made to develop computing technology to automate handling support issues for different industries.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computing device.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), solid state storage, hard disk, EEPROM (electrically erasable programmable read only memory), memory stick or any other storage device type, in accordance with the claimed subject matter.

In one aspect, computing technology is provided for automatically identifying and resolving support issues that are reported by devices, clients and the like. A machine learning training model is developed using historical stored electronic support data. A plurality of fields are used for automatically labeling ("auto-labelling") the historical support data. For example, the auto-labels identify a "problem" category and a "resolution" for previously resolved support issues. Typically, historical support data is extensive with numerous fields. To manually label each support case for generating the training model can be labor intensive and hence undesirable. As described in more detail, the auto-labelling reduces the overall workload of a computing device for generating the training model because the computing device uses limited, auto-labelled datasets. This enables the computing device to use computing resources for other tasks.

In one aspect, an auto-labelled dataset generated from historical support data identifies various problem categories. Each problem category is represented by an assigned virtual "space" and each support case is identified by a vector within the virtual space. A feature set is extracted from the auto-labelled dataset. The feature set varies based on the support environment. For example, in case of a networked storage environment, the feature set may include an operating system version number, an application version number, an operating system mode, or any other feature. The problem description of each support case is converted into a numerical value, and thereafter, the training model is deployed.

When a new support case with one or more support issue is received, the training model identifies one or more previous "proximate" support cases and determines one or more proximate support case with one or more solutions that may be relevant to the new support case. The relevant solution (s) is then used to automatically provide a solution for new support case. Details regarding the use of this innovative machine learning technology are provided below.

Figure 1A:
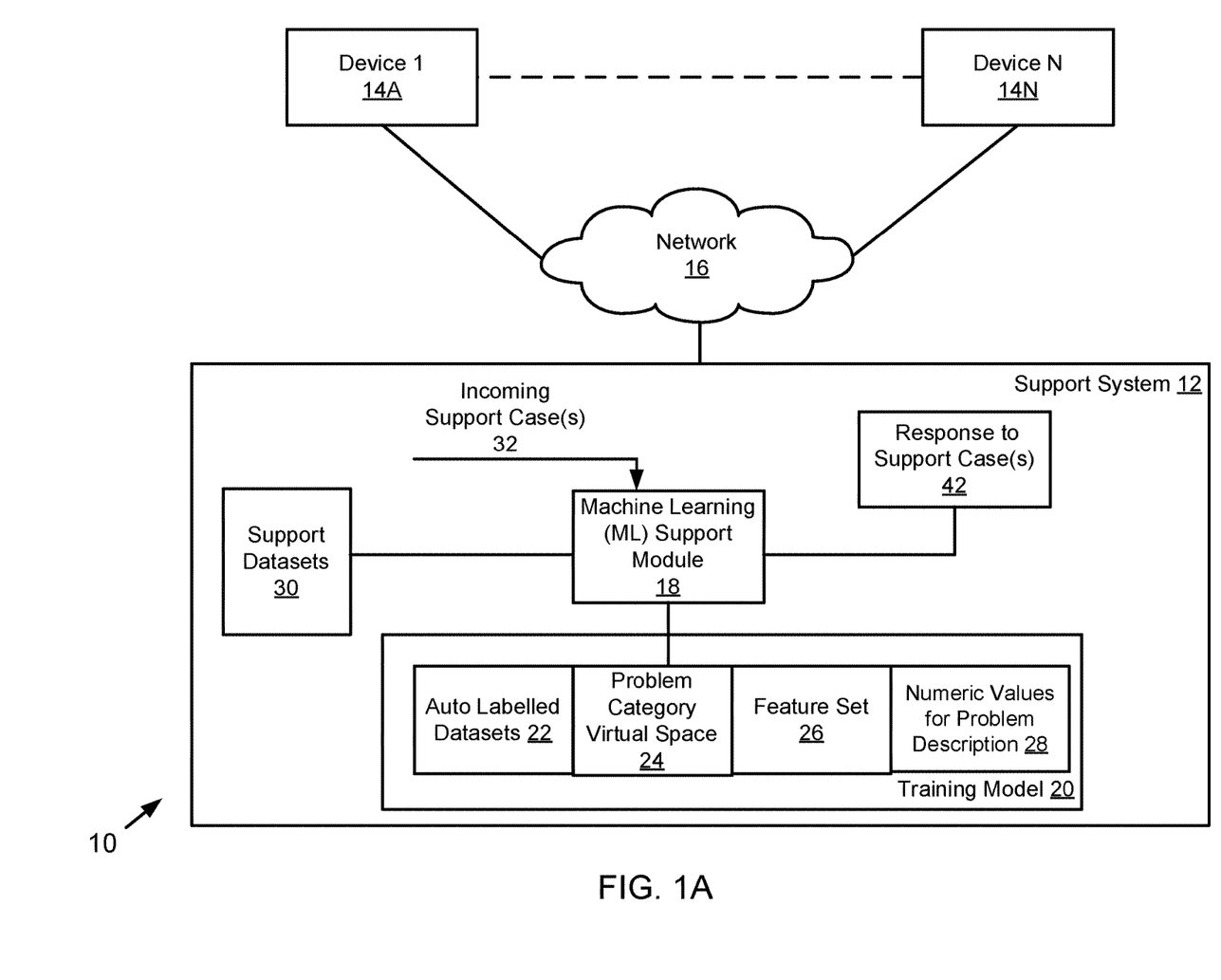
FIG. 1A shows an example of a system with a machine learning support module for automated handling support requests, according to one aspect of the present disclosure.

System 10: FIG. 1A shows an example of a system 10, according to one aspect of the present disclosure. System 10 includes various devices 14A-14N (may be referred to as "device 14" or "devices 14") that are connected to a network 16 having one or more switches, routers and other devices. Network 16 includes the Internet, a local area network, a wide area network, metropolitan area network, wired and wireless networks or any other network type. A device support system (may also be referred to as "support system") 12 interfaces with the network 16. Devices 14 may be any type of devices including computing devices, mobile devices, storage systems, servers, or any other device type. The adaptive aspects of the present disclosure are not limited to any specific device type.

Support System 12 includes a processor executable machine learning ("ML") support module (may also be referred to as "support module") 18 that receives one or more support cases 32 and outputs a response 42 based on a training model 20 that is described below in more detail. The training model 20 is built using support datasets 30 that are accessible to the support module 18. Support datasets 30 include electronic data associated with support cases that were received prior to the support case 32. The training model 20 is built using an auto-labelled dataset 22, a problem category virtual space 24, a feature set 26 and numeric values 28 associated with problem descriptions. Details of generating the training model 20 are provided below.

Figure 1B:
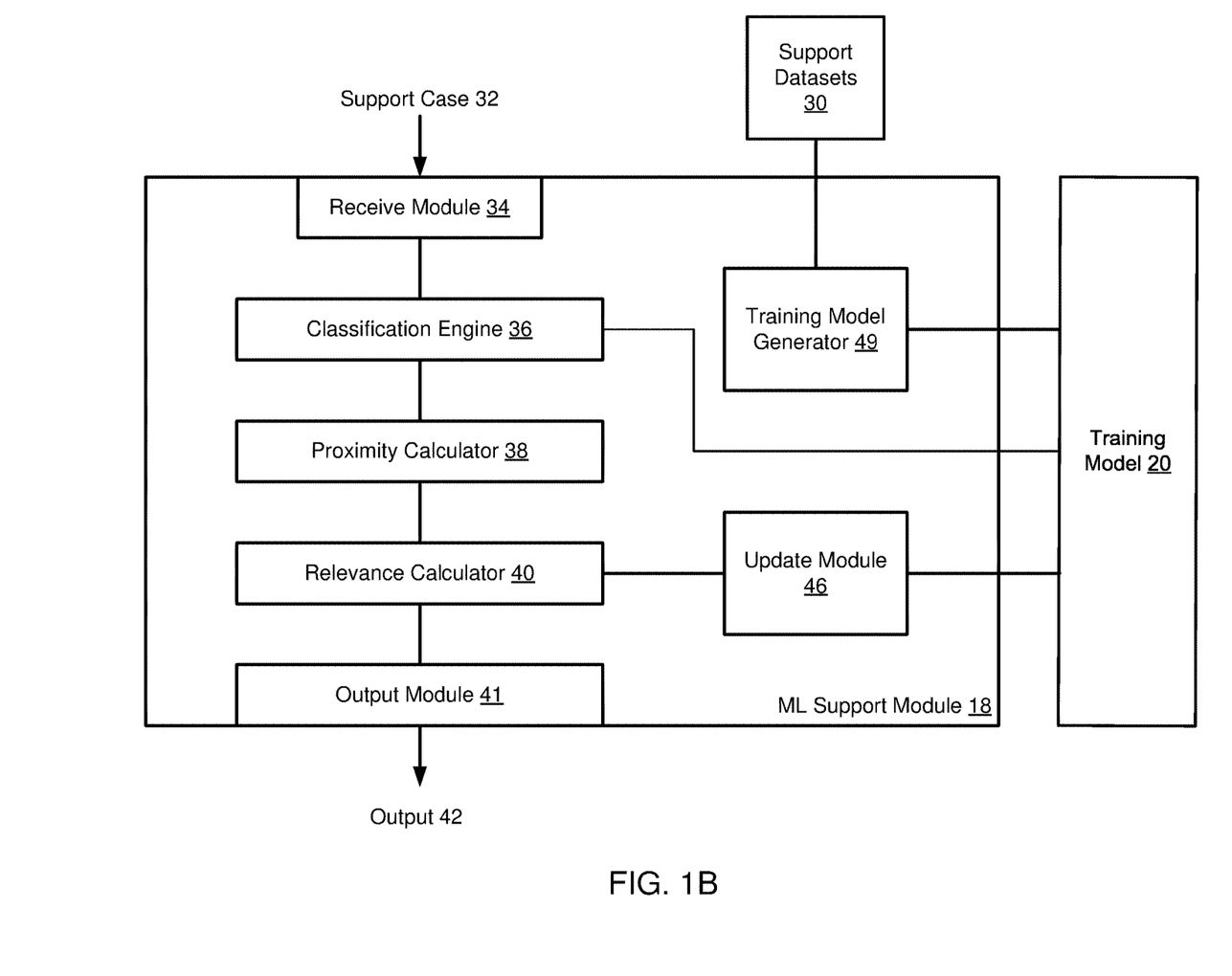
FIG. 1B shows an example of the machine learning support module of FIG. 1A, according to one aspect of the present disclosure.

FIG. 1B shows a block diagram of the support module 18, according to one aspect of the present disclosure. In one aspect, the support module 18 includes a training model generator (may also be referred to as "generator") 49 that uses historical support datasets 30 to generate the training model 20, as described below with respect to FIG. 1C. The training model 20 is updated by an update module 46 as new support cases 32 are received and resolved, thus the training model 20 machine learns and continues to improve its accuracy over time.

In one aspect, the support module 18 includes a receive module 34 that receives a new support case 32. The support case 32 may be received directly from devices 14 or from an intermediate computing system (not shown). The support case 32 may be in any format and typically includes a description of a problem, an impacted device or its components, including hardware, software or both, a unique identifier identifying the support case 32, and other information related to an encountered or potential problem. The receive module 34 extracts one or more features (may be referred to as a feature set) from the support case 32 and provides the feature set to a classification engine 36. It is noteworthy that the feature set varies based on the information that is included in support case 32, and the information in support case 32 varies based on the type of devices/software that are being supported.

The classification engine 36 using the training model 20 identifies a potential problem category and a problem space (also referred to as "assigned virtual space") associated with the potential problem category. A proximity calculator 38 identifies other support cases that are "proximate" to the received support case 32 within an assigned virtual space for the potential problem category (e.g., as discussed in more detail with respect to at least FIG. 1D below). In one aspect, a certain number of proximate support cases (e.g. X number of cases) that are closest to the received support case 32 are identified. The "proximity" of the other support cases may be determined by cosine similarity or any other technique, as described below in detail. In another aspect, the proximity of the other support cases maybe based on a threshold distance between the new support case 32 and the other support cases. The threshold distance varies based on the potential problem category, the number of previous support cases and the overall distribution of the previous support cases within the assigned virtual space.

A relevance calculator 40 determines the overall relevance of the proximate support cases to the received support case 32 (e.g., as discussed in more detail with respect to at least FIG. 1D below). The relevance information is used to periodically update the training model 20. An output 42 is generated by the output module 41 providing a resolution to solve the problem highlighted by the support case 32.

In one aspect, the support module 18 may be deployed as an application programming interface (API), e.g. a Representational State Transfer (REST) API with the training model 20 or has access to the training model 20. The API is configured to receive support cases (e.g. illustrated as support case 32) and automatically provides a resolution or a resolution code indicating a solution (e.g. illustrated as output 42) for the support case. In another aspect, the output 42 may be used to automatically change a configuration of an impacted device, a component or a sub-component. The change in configuration will depend on the problem type and the device type. Details regarding using support system 12 are provided below.

Figure 1C:
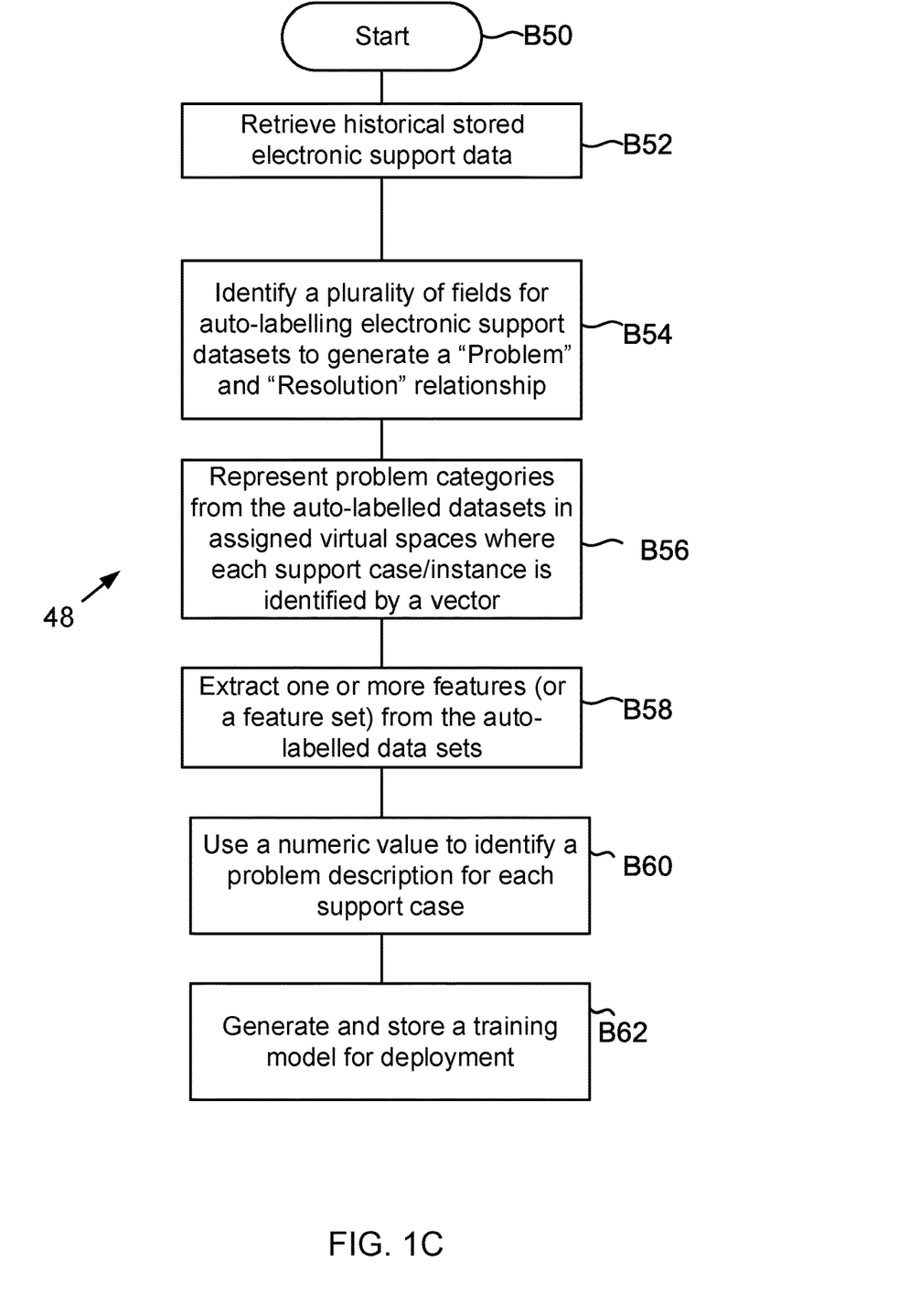
FIG. 1C shows a process flow diagram for training a machine learning model for automatically processing support issues, according to one aspect of the present disclosure.

Process Flows: FIG. 1C shows a process flow 48, according to one aspect of the present disclosure. The process begins in block B50, when generator 49 (from FIG. 1B) is initialized. In block B52, support datasets 30 are accessed by the generator 49. In one aspect, support systems and organizations maintain support datasets 30 at one or more storage devices. The support datasets 30 include metadata such as a case identifier (e.g. a support ticket number) that identifies a support case, symptom information that provides details associated with a problem (e.g. a storage cluster is not reachable by a management application managing the cluster or any other problem), a component/sub-component associated with the problem, component/sub-component details, a resolution for the support case, a resolution identifier, a customer identifier, a version indicator when a software application is involved, and/or a location associated with the case identifier or any other information that is customized based on the environment that is being supported. Typically, the support center may store a large amount of historical support data. To generate the training model 20, manually parsing through this data can be cumbersome and resource intensive.

In one aspect, in block B54, a plurality of fields are selected by generator 49 for auto-labelling support datasets 30. The auto-labelling identifies a "problem" and a "resolution" by using a "P" label and a "R" label. In one aspect, as an example, the "problem" may be defined by "components" and "component details" and the resolution is defined by an identifier that includes or points to resolution details. This enables generator 49 to efficiently auto-label stored support datasets 30 such that the auto-labeled support datasets 22 (FIG. 1A) become usable for generating the training model 20. It is noteworthy that any metadata field in a support case may be used to auto-label the support datasets 30. The adaptive aspects of this disclosure are not limited to using any specific fields for auto-labelling the support datasets 30.

Once the support dataset has been auto-labelled, in block B56, each problem category indicated by the P label is represented by an assigned virtual space. In one aspect, the assigned virtual space is determined by processor executable code (e.g., executable code for generator 49) to represent each support case, uniquely identified by an identifier, as a vector. The boundaries of the assigned virtual space are based on a total number of support cases for each problem category and the maximum distance between at least two support cases. An example of an assigned "problem" virtual space 80 is shown in FIG. 1E. Each support case within the assigned virtual space 80 is represented by an individual vector, shown as 81.

In block B58, the generator 49 also extracts a set of features (e.g., feature set 26 illustrated in FIG. 1A) from the support datasets 30. The set of features may include various fields indicative of the features associated with the P label and the R label for each support case. For example, the extracted features for the support system 12 deployed in a networked storage system may include an operating system version number, an application version number, an operating system mode indicator, or any other feature. It is noteworthy that the adaptive aspects of the present disclosure are not limited to any specific feature and the extracted features vary based the type of devices that the support system 12 is supporting.

In block B60, text associated with the problem label (i.e. the P-label) of each support case is converted into a numeric value (e.g., numeric values for problem description 28 illustrated in FIG. 1A). The text describes the problem/potential problem/issue related to a support case. In one aspect, generator 49 may use a "bag-of-words" approach to convert the text into a numerical vector. The bag-of-words model is used for document classification, where a frequency of occurrence of each word may be used as a feature for training a classification engine (e.g. classification engine 36, FIG. 1). Once the text conversion is complete, the training model 20 is generated and stored in block B62 for deployment. As shown in FIG. 1A, the stored training model 20 includes the auto-labelled datasets 22 obtained from block B54, the assigned virtual space for each problem category obtained from block B56, the extracted feature sets 26 obtained 1s from block B58, and the numeric values 28 for each problem description obtained from block B60.

Figure 1D:
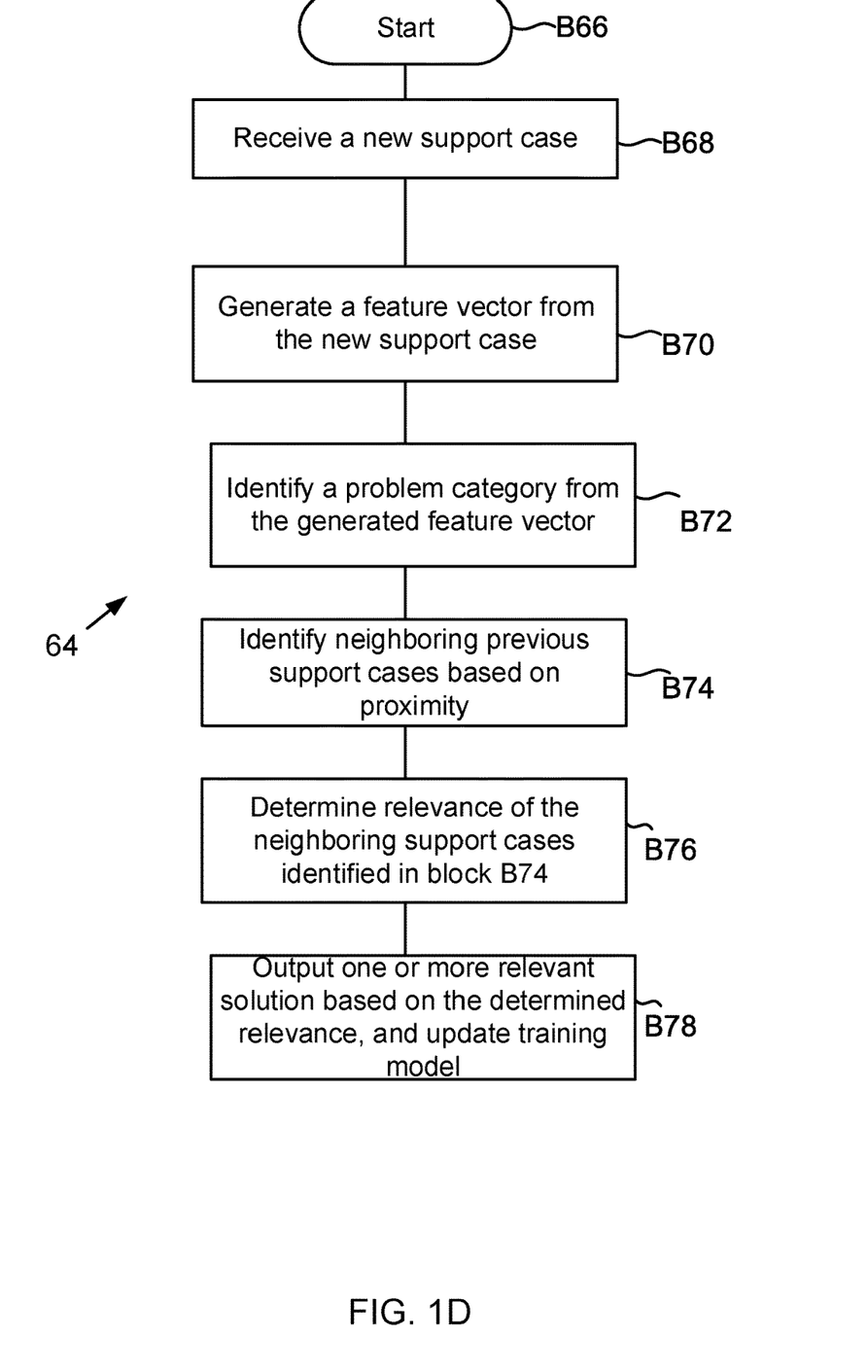
FIG. 1D shows a process flow diagram for using the training model generated in FIG. 1C, according to one aspect of the present disclosure.
Figure 1E:
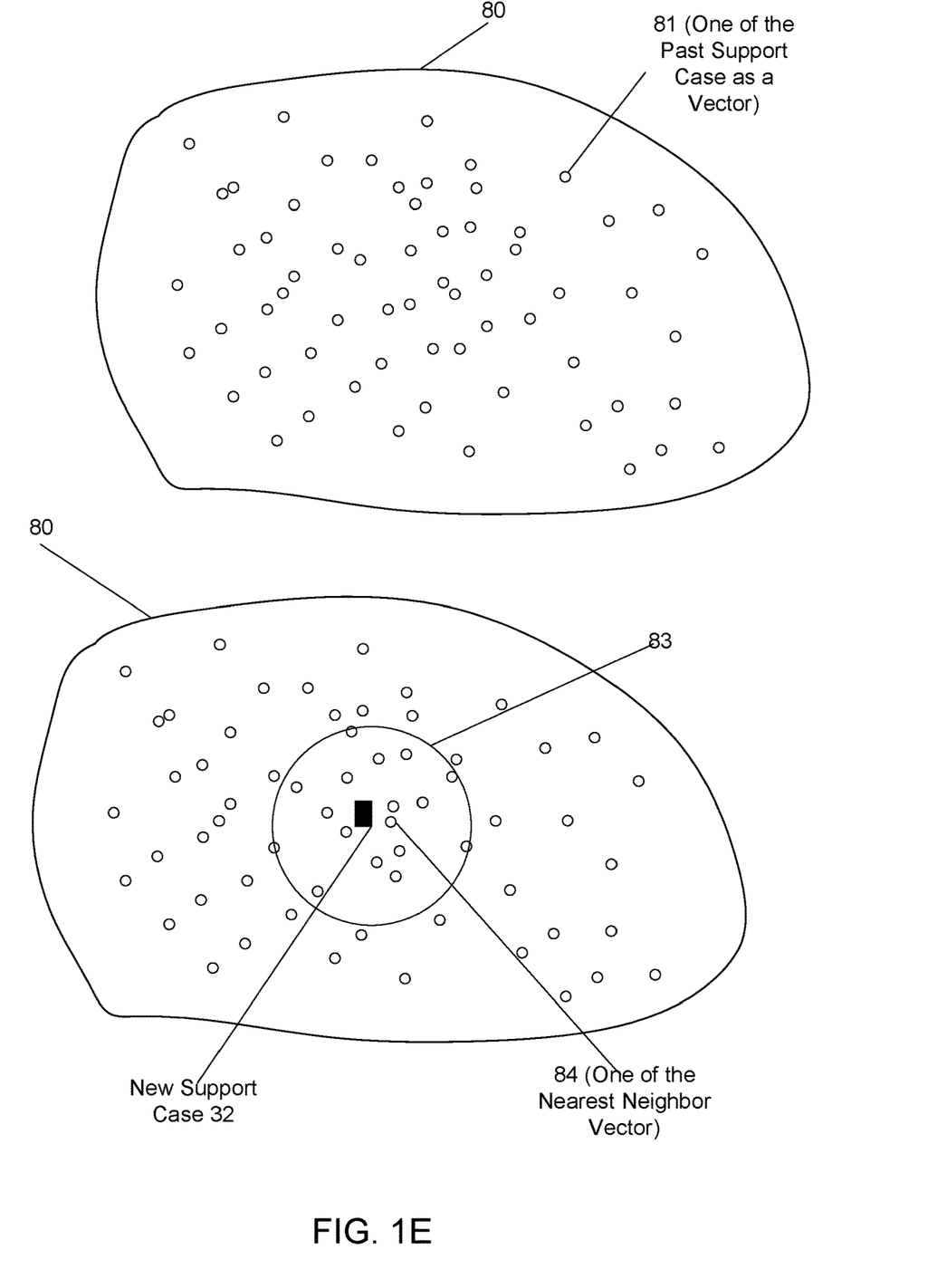
FIG. 1E illustrates an example of using the process flow diagrams of FIGS. 1C and 1D, according to one aspect of the present disclosure.

FIG. 1D shows a process 64 for using and updating the training model 20, according to one aspect of the present disclosure. Process 64 begins in block B66 after the training model 20 has been generated using the process blocks of FIG. 1C.

Figure 1F:
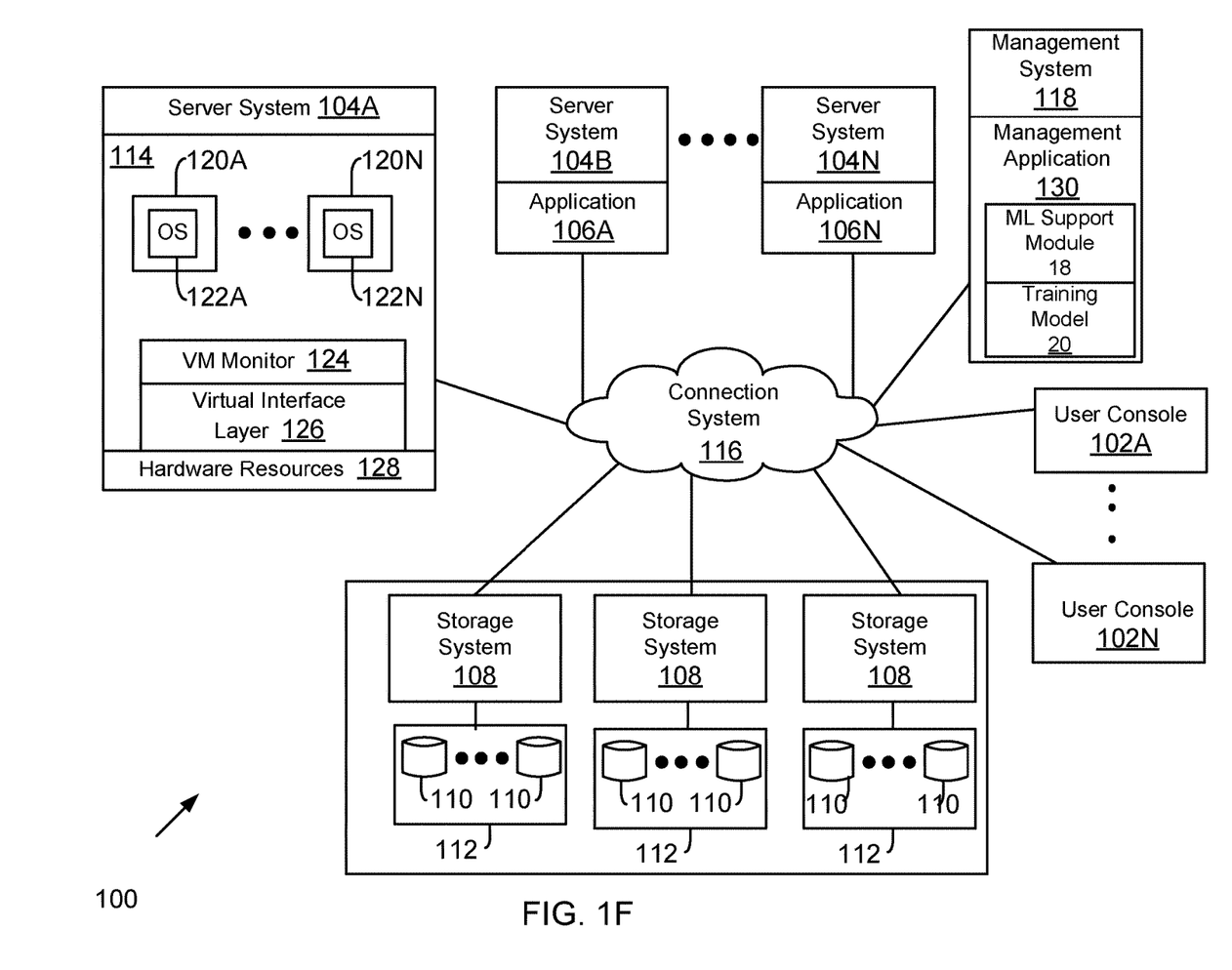
FIG. 1F shows an example of a storage environment for implementing the various aspects of the present disclosure.

In block B68, a new support case (e.g. 32, FIG. 1B) is received by the support module 18. The support case 32 is received by the receive module 34 (FIG. 1). In block B70, the receive module 34 extracts a feature vector from the support case. The feature vector is used to predict a high level problem category to which the support case may belong. The feature vector is provided to the classification engine 36 in block B72. The classification engine 36 uses the training model 20 to predict one or more problem categories based on the feature vector. For example, assume that the support case 32 states "a storage cluster is not accessible by an identified management application and performance data collection failed" with respect to a networked storage environment as shown in FIG. 1F. The classification engine 36 extracts the identity of the management application and predicts "the management application" and the "integration" of the management application with the storage cluster as the problem category.

Based on the one or more predicted problem category, in block B74, the proximity calculator 38 uses the training model 20 to identify a certain number of previous support cases that are closest to the new support case 32. The certain number of proximate support cases may be pre-programmed, for example, X. The proximity calculator 38 evaluates a virtual space associated with (or assigned to) the one or more problem category and the distribution of previous support cases within the virtual problem space. The proximate support cases may be determined by using cosine similarity or any other technique. Cosine similarity is a measure of is similarity between two non-zero vectors (e.g. two different support cases within an assigned problem space) of an inner product space that measures the cosine of the angle between them. For example, assume that two support cases are represented by vectors X and Y. Then the cosine similarity between the two vectors is determined by: $X*Y/|X||Y|$ In another aspect, the proximate or closest support cases are previous support cases that are located within a threshold distance of the new support case 32 in a problem space assigned to the one or more predicted problem category. The threshold distance is configurable and may vary based on the predicted problem category, the distribution and number of previous support cases within each predicted problem category. For example, when a specific problem category has a large number of previous support cases and the density of the previous support cases around the new support case is high, then the threshold distance may be shorter compared to if the number of pervious support cases were fewer and are sparsely spread out around the new support case.

An example of a problem space is illustrated as problem space 80 in FIG. 1E. The incoming support case 32 is shown as a rectangle within the problem space 80. The proximate support cases are located within a circle 83. The proximate cases are shown as smaller circles and one of the closest support case is labelled as "nearest neighbor" 84. While multiple proximate support cases 84 are shown for convenience, there may be just one nearest support case within circle 83.

Returning to FIG. 1D, not every proximate support case may be relevant to the new support case 32 or helpful in finding a resolution. Therefore, in block B76, the relevance calculator 40 uses the training model 20 to determine the relevance of each proximate support case to the received support case 32. The relevance may be determined by a relevance score. The relevance score can be determined by one or more different techniques. For example, the relevance score may be determined by: $P(E1 \cap E2) = P(E1) \cdot P(E2)$, where E1 is a most recently used resolution code event of a proximate case and E2 is the most frequently used resolution code event for the proximate case.

P(E1)=Number of resolution codes that are less recent than a given resolution code/Total number of resolution codes within the problem space (e.g. problem space 80 of FIG. 1E)

P(E2)=Number of resolution codes less frequent than a given resolution code/Total number of resolution codes within the problem space (e.g. problem space 80 of FIG. 1E)

Based on the proximity and the determined relevance score, in block B78, one or more relevant solutions (e.g. one or more resolution codes in output 42 indicating a solution for the support case 32) are provided to the entity that requested the support (e.g., devices 14 or from an intermediate computing system). Based on the resolution, the assigned problem space is updated, which in turn updates the training model 20.

The computing technology disclosed herein regularly updates the training model 20, which improves accuracy of the overall support system managing support cases. This improves computing technology for handling customer support issues.

In one aspect, the present disclosure improves computing technology for providing automated support for different operating environments. The use of auto-labelled datasets reduces the overall amount of data a computing system has to process and evaluate for developing a training model. This frees up computing resources for other tasks. Furthermore, because the training model is regularly updated, the computing technology can accurately resolve support issues.

In yet another aspect, the technical solutions provided herein are necessarily rooted in computer technology because they enable a computing system to efficiently and accurately resolve support issues, especially for devices in a networked environment. The technical solutions provided herein fully automate resolving support issues, which cannot be practically solved in the human mind.

In one aspect, methods and systems for automatically managing support requests are provided. One method includes receiving a support case (32, FIG. 1B) by a processor executable application programming interface (API), the support case indicating a problem associated with a device; and utilizing (B72, FIG. 1D) a training model (20, FIG. 1A) to predict a problem category for the support case. The training model predicts the problem category based on at least a feature (or a feature vector) extracted from information included in the support case. The method further includes identifying (B74, FIG. 1D) from the training model a plurality of proximate support cases based on a distance between the support case and the proximate support cases within a virtual space assigned to the predicted problem category; determining (B76, FIG. 1D) from the training model, relevance of each proximate support case to the support case; and outputting (B78, FIG. 1D) by the API, a resolution code for the support case based on the determined relevance of each proximate support case.

In another aspect, a non-transitory machine readable storage medium having stored thereon instructions for performing a method is provided. The machine executable code which when executed by at least one machine, causes the machine to: utilize a training model to predict a problem category for a support case indicating a problem associated with a device, where the training model predicts the problem category based on a feature extracted from information included in the support case; determine from the training model a plurality of proximate support cases based on a distance between the support case and the proximate support cases in a virtual space assigned to the predicted problem category; determine from the training model, relevance of each proximate support case to the support case; and output a resolution code for the support case based on the determined relevance of each proximate support case.

In yet another aspect, an apparatus is provided. The apparatus includes a memory containing machine readable medium comprising machine executable code having stored thereon instructions; and a processor coupled to the memory to execute the machine executable code to: predict a problem category for a support case indicating a problem associated with a device, where the problem category is predicted from a training model based on a feature extracted from information included in the support case; utilize the training model to identify a plurality of proximate support cases based on a distance between the support case and the plurality of proximate support cases within a virtual space assigned to the predicted problem category; determine relevance of each proximate support case to the support case from the training model; and output a resolution code for the support case based on the determined relevance of each proximate support case.

In another aspect, another method is provided. The method includes auto-labelling (B54, FIG. 1C) by a processor, data for a plurality of support cases associated with a plurality of devices, each support case auto-labelled with a first field indicating a problem category associated with each support case and a second field providing a resolution code for each support case, the resolution code indicating resolution of an issue reported by each support case; utilizing (B56, FIG. 1C) by the processor, an assigned virtual space to represent each problem category associated with the plurality of support cases, where each support case with an associated resolution code is represented as a vector within the assigned virtual space; extracting (B58, FIG. 1C) by the processor, a plurality of features associated with each support case; converting (B60, FIG. 1C) by the processor, text associated with the problem category of each support case into a numerical value; generating (B62, FIG. 1C) by the processor, a model (training model 20, FIG. 1A) based on the assigned virtual space, the plurality of features and the numerical value; and utilizing (B72, FIG. 1D) the model by the processor for predicting a problem category for a new support case. The processor extracts a feature from the new support case to predict the problem category.

The method further includes identifying (B74, FIG. 1D) by the processor, a plurality of proximate support cases based on a distance between the new support case and the plurality of proximate support cases within an assigned virtual space for the predicted problem category; determining (B76, FIG. 1D) by the processor, relevance of each proximate support case to the new support case; and outputting (B78, FIG. 1D) by the processor, a resolution code for the new support case based on the determined relevance of the proximate support cases.

System 100: FIG. 1F shows an example of a networked storage operating environment 100 (also referred to as system 100), for using the support module 18 and the training model 20 described above with respect to FIGS. 1A-1E, according to one aspect of the present disclosure. The support module 18 and the training model 12 provide automatic resolution to reported problems within system 100. The support module 18 and the training model 20 may be located anywhere within system 100. As an example, the support module 18 and the training model 20 are shown as part of a management application 130 of a management system 118 that manages the various hardware/software components of system 100. The adaptive aspects are of course not limited to any specific location for executing the support module 18 for using the training model 20.

In one aspect, system 100 may include a plurality of computing systems 104A-104N (may also be referred to and shown as server system (or server systems) 104 or as host system (or host systems) 104 that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102). Any support issues related to the use of servers 104 and connectivity are handled by the support module 18, as described above with respect to FIGS. 1A-1E.

Server systems 104 may be computing devices configured to execute applications 106A-106N (may be referred to as application 106 or applications 106) over a variety of operating systems, including the UNIX®, Microsoft Windows®, and Linux® based operating systems. Applications 106 may utilize data services of storage system 108 to access, store, and manage data in a set of storage devices 110 that are described below in detail. Applications 106 may include a database program, an email program or any other computer executable program. Any support issues related to the use of applications can be processed by the support module 18 as described above.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN). Furthermore, the server systems 104 may utilize a persistent memory (PM) based file system that uses persistent memory of server systems 104 for storing data.

In one aspect, server 104A executes a virtual machine environment 114, according to one aspect. In the virtual machine environment 114, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 114 includes a plurality of VMs 120A-120N that execute a plurality of guest OS 122A-122N (may also be referred to as guest OS 122) to share hardware resources 128. As described above, hardware resources 128 may include CPU, memory, I/O devices, storage or any other hardware resource.

A virtual machine monitor (VMM) 124, for example, a processor executed hypervisor layer provided by VMWare Inc., Hyper-V layer provided by Microsoft Corporation (without derogation of any third party trademark rights) or any other virtualization layer type, presents and manages the plurality of guest OS 122. VMM 124 may include or interface with a virtualization layer (VIL) 126 that provides one or more virtualized hardware resource 128 to each guest OS. For example, VIL 126 presents physical storage at storage devices 110 as virtual storage (for example, as a virtual hard drive (VHD)) to VMs 120A-120N.

In one aspect, VMM 124 is executed by server system 104A with VMs 120A-120N. In another aspect, VMM 124 may be executed by a separate stand-alone computing system, often referred to as a hypervisor server or VMM server and VMs 120A-120N are presented via another computer system. It is noteworthy that various vendors provide virtualization environments, for example, VMware Corporation, Microsoft Corporation (without derogation of any third party trademark rights) and others. The generic virtualization environment described above with respect to FIG. 1F may be customized depending on the virtual environment provider.

In one aspect, any support issues related to VMs 120A-120N and/or the VMM 124 can be resolved by the support module 18, described above in detail.

System 100 may also include the management system 118 executing the management application 130 for managing and configuring various elements of system 100. The management application 130 includes software instructions for monitoring the performance of the storage system 108 based on service level agreements for different clients. The management application 130 may also present the support module 18 as a REST API to servers 104 and user consoles 102 for receiving new support cases and providing a solution, as described above with respect to FIGS. 1A-1E.

In one aspect, when servers 104A-104N or user console 102A-102N have any problems with respect to accessing storage system 108, experience network connection issues or any other is problem type, then the impacted device/software application may generate a support ticket (referred to as a support case). The support case is provided to the support module 18 that uses the training model 20 to present a resolution for the support case, as described above in detail.

In one aspect, storage system 108 is a shared storage system having access to a set of mass storage devices 110 (may be referred to as storage devices 110) within a storage subsystem 112. As an example, storage devices 110 may be a part of a storage array within the storage subsystem 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may also be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 124 as a storage volume or one or more qtree sub-volume units including logical unit numbers (LUNs). Each storage volume may be configured to store data files (or data containers or data objects), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 executing a storage operating system (not shown) may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 120A-120N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

In one aspect, the support module 18 is presented as a REST API to the storage system 108 for receiving new support cases and providing a solution, as described above with respect to FIGS. 1A-1E.

In one aspect, storage system 108 may have a distributed architecture, for example, a cluster based system that may include a separate network module and a storage module. Briefly, the network module is used to communicate with server systems 104 and management system 118, while the storage module is used to communicate with the storage devices 110.

Figure 2:
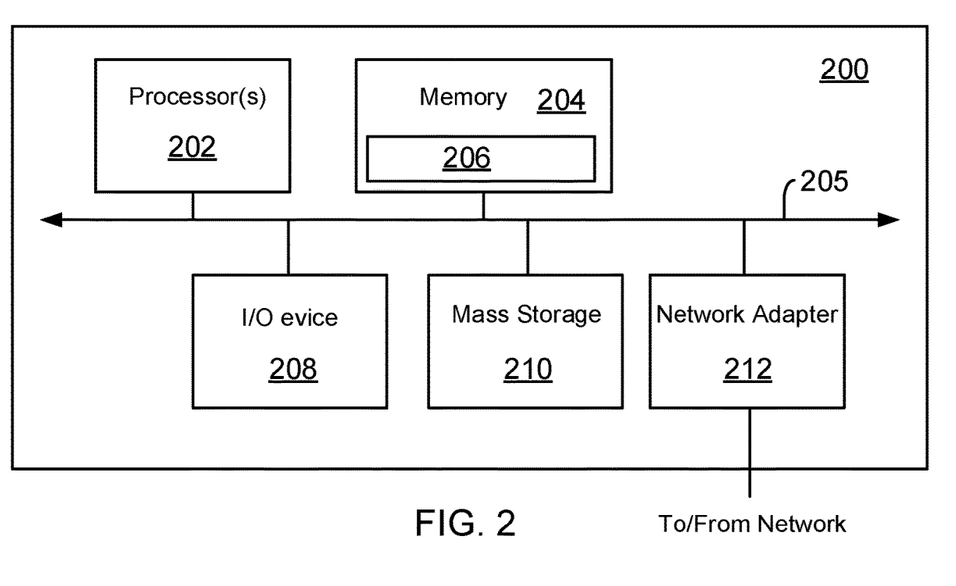
FIG. 2 shows an example of a processing system, according to one aspect of the present disclosure.

Processing System: FIG. 2 is a high-level block diagram showing an example of the architecture of a processing system, at a high level, in which executable instructions as described above can be implemented. The processing system 200 can represent modules of the support system 12 (FIG. 1A), devices 14 (FIG. 1A), management system 118, user console 102, server systems 104, storage system 108 (FIG. 1F) and others. Note that certain standard and well-known components which are not germane to the present invention are not shown in FIG. 2.

The processing system 200 includes one or more processors 202 and memory 204, coupled to a bus system 205. The bus system 205 shown in FIG. 2 is an abstraction that represents any one or more separate physical buses and/or point-to-point connections, connected by appropriate bridges, adapters and/or controllers. The bus system 205, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 202 are the central processing units (CPUs) of the processing system 200 and, thus, control its overall operation. In certain aspects, the processors 202 accomplish this by executing programmable instructions stored in memory 204. Processors 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 204 represents any form of random access memory (RAM), read-only memory (ROM), flash memory, or the like, or a combination of such devices. Memory 204 includes the main memory of the processing system 200. Instructions 206 which implements techniques 1s introduced above may reside in and may be executed (by processors 202) from memory 204. For example, instructions 206 may include code for executing the process steps of FIGS. 1C-1D.

Also connected to the processors 202 through the bus system 205 are one or more internal mass storage devices 210, and a network adapter 212. Internal mass storage devices 210 may be or may include any conventional medium for storing data in a non-volatile manner. The data may include the support data 30 and the training model 20.

The network adapter 212 provides the processing system 200 with the ability to communicate with remote devices (e.g., storage servers) over a network and may be, for example, an Ethernet adapter, a FC adapter, or the like. The processing system 200 also includes one or more input/output (I/O) devices 208 coupled to the bus system 205. The I/O devices 208 may include, for example, a display device, a keyboard, a mouse, etc.

The system and techniques described herein are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this disclosure, the support system 12 is accessible to a client via a cloud for reporting support cases and receiving a solution for the reported support cases.

After the application layer, is a cloud platform and cloud infrastructure, followed by a "server" layer that includes hardware and computer software designed for cloud specific services. Details regarding these layers are not germane to the inventive aspects.

Thus, methods and systems for managing support issues have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method executed by one or more processors, comprising:
   receiving, by a support module, a support case indicating a problem associated with a networked storage environment, the support module implemented as a processor executable application programming interface (API) that is presented to one or more computing devices and a storage system of the networked storage environment, the one or more computing devices configured to access one or more storage devices of the storage system via a network connection;
   extracting, by the support module, a feature vector from information included in the support case; predicting, by the support module using a training model, a problem category for the support case based on the feature vector; assigning, by the support module, a virtual problem space for the predicted problem category;
   identifying, by the support module, from the training model, a plurality of previously processed proximate support cases based on a comparison of a distance between the support case and the proximate support cases within the virtual problem space to a configurable threshold distance value, the configurable threshold distance value varies based on a density of previously processed support cases around the support case and a total number of the previously processed support cases; determining, by the support module, from the training model, relevance of each identified proximate support case to the support case, based on $P(E1 \cap E2)=P(E1) \cdot P(E2)$, where E1 is a most recently used resolution code event of each identified proximate case, E2 is a most frequently used resolution code event for each identified proximate case, P(E1) is equal to a number of resolution codes that are less recent than a given resolution code divided by a total number of resolution codes within the assigned virtual problem space and P(E2) is equal to a number of resolution codes less frequent than a given resolution code divided by the total number of resolution codes within the assigned virtual problem space; outputting, by the support module, a resolution code for the support case based on the determined relevance of each proximate support case;
   using the resolution code to resolve the support case by automatically modifying a configuration associated with a networked storage environment entity impacted by the problem;
   and iteratively updating, by the support module, the training model with the resolution code and resolution codes of new support cases received and resolved after the support case using the training model.

2. The method of claim 1, further comprising:
   auto-labelling stored data of a plurality of support cases associated with a plurality of devices of the networked storage environment, the data having a first field indicating a problem category associated with each support case and a second field providing a resolution code for each support case, the resolution code indicating resolution of an issue reported by each support case.

3. The method of claim 2, further comprising:
   generating the training model by extracting a plurality of features associated with each support case and converting text associated with the problem category of each support case to a numerical value.

4. The method of claim 2, further comprising:
   representing each support case with an associated resolution code as a vector within an assigned virtual space for each problem category.

5. The method of claim 1, wherein the relevance of each proximate case is based on a number of resolution codes that are less frequent than a given resolution code compared to a total number of resolution codes within the assigned virtual space for the predicted problem category.

6. The method of claim 1, wherein the relevance of each proximate case is based on a number of resolution codes that are less recent than a given resolution code compared to a total number of resolution codes within the assigned virtual space for the predicted problem category.

7. The method of claim 1, wherein the relevance of each proximate case is based on using most recent resolution codes of the proximate support cases compared to a total number of resolution codes within the assigned virtual space for the predicted problem category.

8. A non-transitory machine readable storage medium having stored thereon instructions for performing a method, comprising machine executable code which when executed by at least one machine, causes the machine to:
   present a support module as a processor executable application programming interface (API) to one or more computing devices and a storage system of a networked storage environment, the one or more computing devices configured to access one or more storage devices of the storage system via a network connection;
   predict, by the support module, using a training model, a problem category a support case indicating a problem associated with the network storage environment based on a feature extracted from information included in the support case;
   determine, by the support module, using the training model, a plurality of previously processed proximate support cases based on a comparison of a distance between the support case and the previously processed proximate support cases in a virtual space assigned to the predicted problem category to a configurable threshold distance value, the configurable threshold distance value varies based on a density of previously processed support cases around the support case and a total number of the previously processed support cases;
   determine, by the support module, using the training model, relevance of each previously processed proximate support case to the support case, the relevance based on $P(E1 \cap E2)=P(E1) \cdot P(E2)$, where E1 is a most recently used resolution code event of each identified proximate case, E2 is s most frequently used resolution code event for each identified proximate case, P(E1) is equal to a number of resolution codes that are less recent than a given resolution code divided by a total number of resolution codes within the assigned virtual problem space and P(E2) is equal to a number of resolution codes less frequent than a given resolution code divided by the total number of resolution codes within the assigned virtual problem space; and
   output, by the support module, a resolution code for the support case based on the determined relevance of each proximate support case;

use the resolution code to resolve the support case by automatically modifying a configuration associated with a networked storage environment entity impacted by the problem; and iteratively update, by the support module, the training model with the resolution code and resolution codes of new support cases received and resolved after the support case using the training model.

9. The non-transitory machine readable storage medium of claim 8, wherein the training model is generated based on auto-labelling stored data for a plurality of support cases associated with a plurality of devices of the networked storage environment, the auto-labelled data having a first field indicating a problem category associated with each support case and a second field providing a resolution code for each support case, the resolution code indicating resolution of an issue reported by each support case.

10. The non-transitory machine readable storage medium of claim 9, wherein to generate the training model, a plurality of features associated with each support case are extracted and text associated with the problem category of each support case is converted into a numerical value.

11. The non-transitory machine readable storage medium of claim 8, wherein the resolution code is used to update the assigned virtual space, which updates the training model.

12. The non-transitory machine readable storage medium of claim 8, wherein the relevance of each proximate case is based on a number of resolution codes that are less frequent than a given resolution code compared to a total number of resolution codes within the assigned virtual space for the predicted problem category.

13. The non-transitory machine readable storage medium of claim 8, wherein the relevance of each proximate case is based on a number of resolution codes that are less recent than a given resolution code compared to a total number of resolution codes within the assigned virtual space for the predicted problem category.

14. The non-transitory machine readable storage medium of claim 8, wherein the relevance of each proximate case is based on using most recent resolution codes of the proximate support cases compared to a total number of resolution codes within the assigned virtual space for the predicted problem category.

15. An apparatus comprising: a memory containing machine readable medium comprising machine executable code having stored thereon instructions for an application programming interface (API) implementing a support module, the API presented to one or more computing devices and a storage system of a networked storage environment, the one or more computing devices configured to access one or more storage devices of the storage system via a network connection;

and a processor coupled to the memory to execute the machine executable code to: predict, by the support module, using a training model, a problem category for a support case indicating a problem associated with the networked storage environment based on a feature extracted from information included in the support case;

utilize, by the support module, the training model to identify a plurality of previously processed proximate support cases based on a comparison of a distance between the support case and the plurality of previously processed proximate support cases within a virtual space assigned to the predicted problem category to a configurable threshold distance value, the configurable threshold distance value varies based on a density of previously processed support cases around the support case and a total number of the previously processed support cases; determine, by the support module, relevance of each previously processed proximate support case to the support case from the training model based on $P(E1 \cap E2)=P(E1) \cdot P(E2)$, where E1 is a most recently used resolution code event of each identified proximate case, E2 is a most frequently used resolution code event for each identified proximate case, P(E1) is equal to a number of resolution codes that are less recent than a given resolution code divided by a total number of resolution codes within the assigned virtual problem space and P(E2) is equal to a number of resolution codes less frequent than a given resolution code divided by the total number of resolution codes within the assigned virtual problem space;

use the resolution code to resolve the support case by automatically modifying a configuration associated with a networked storage environment entity impacted by the problem;

and iteratively update, by the support module, the training model with the resolution code and resolution codes of new support cases received and resolved after the support case using the training model.

16. The apparatus of claim 15, wherein the training model is generated based on auto-labelling stored data for a plurality of support cases associated with a plurality of devices of the networked storage environment, the auto-labelled data having a first field indicating a problem category associated with each support case and a second field providing a resolution code for each support case, the resolution code indicating resolution of an issue reported by each support case.

17. The apparatus of claim 16, wherein to generate the training model, a plurality of features associated with each support case are extracted and text associated with the problem category of each support case is converted into a numerical value.

18. The apparatus of claim 15, wherein the resolution code is used to update the assigned virtual space, which updates the training model.

19. The apparatus of claim 15, wherein the relevance of each proximate case is based on a number of resolution codes that are less recent than a given resolution code compared to a total number of resolution codes within the assigned virtual space for the predicted problem category.

20. The apparatus of claim 15, wherein the relevance of each proximate case is based on using most recent resolution codes of the proximate support cases compared to a total number of resolution codes within the assigned virtual space for the predicted problem category.

* * * * *